April 12, 1966 — M. L. BOOY — 3,245,662
ECCENTRIC RING DISTRIBUTOR
Filed Sept. 10, 1963

April 12, 1966 M. L. BOOY 3,245,662
ECCENTRIC RING DISTRIBUTOR
Filed Sept. 10, 1963 2 Sheets-Sheet 2

3,245,662
ECCENTRIC RING DISTRIBUTOR
Max Lorenz Booy, Wilmington, Del., assignor to E. I. du Pont de Nemours and Company, Wilmington, Del., a corporation of Delaware
Filed Sept. 10, 1963, Ser. No. 307,927
4 Claims. (Cl. 259—7)

This invention relates generally to the handling of viscous materials and, more particularly, to apparatus improvements which facilitate a more effective and uniform mixture of different materials.

The use of screw extruders is will known in the plastics art for melting granular polymeric material and extruding it to a desired shape. These extruders may be equipped with a separate section, downstream of the conventional material-forwarding screw, wherein a mixing effect is achieved. Providing for mechanical mixing is especially important when dealing with liquids (such as polymer melts) which are so viscous that they are always pumped under streamline flow conditions. A particularly efficient mixing screw of this type has been disclosed by Saxton in U.S. Patent No. 3,006,029. Although effective in combination with a conventional extrusion screw, the screws of Saxton are not completely satisfactory when used solely as mixers, for blending two or more streams of highly viscous liquids.

It is an object of this invention to provide distributors for feeding two or more highly viscous materials to a mixing screw in such a manner as to insure a uniform supply of each material to the mixing zone.

The above and other objects are attained by providing a hollow ring through which a viscous material is distributed radially inwardly to a mixing zone through a plurality of uniformly spaced, equidimensional holes or through a narrow circumferential slot. The distribution ring defines a circumferential channel of predetermined cross-sectional area. The channel is generally rectangular in shape, for convenience in fabrication, and preferably has rounded corners. Its dimensional design is such that the pressure drop of the material flowing therethrough is small in comparison with the pressure drop through the small holes or slot. Preferably, the channel has a sinusoidally changing height so that the shear rate of material flowing therein is above some minimum value, as required to prevent deposits of insoluble or gel-like material on the channels walls. This shear rate factor will depend on gel-susceptibility and temperature of the particular material being pumped.

It is apparent that the distribution ring may be provided with two or more inlets, symmetrically placed. With two inlets, the heights of the circumferential channel is determined by two sinusoidally changing curves intersecting at 90° from each inlet point.

The dimension and number of the distribution holes or slots are selected to provide the required uniformity of mixing at the maximum acceptable pressure drop. The design, arrangement and operation of the distribution ring of this invention will be more readily understood by reference to the accompanying drawings wherein.

Figure 1:
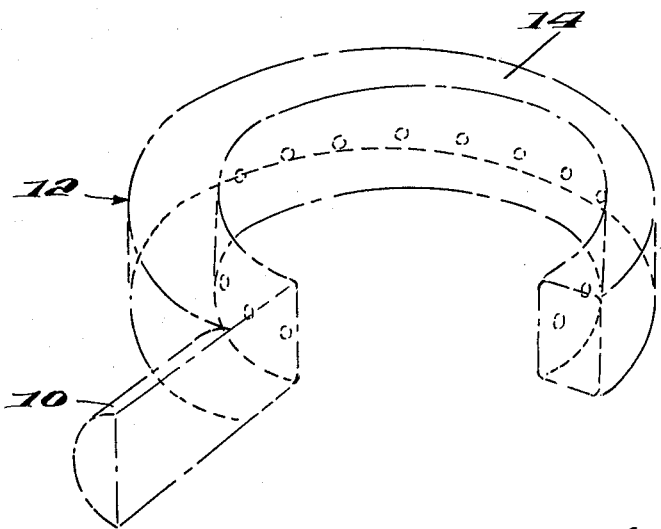
FIGURE 1 is a perspective schematic of a single distribution ring, portions of which have been removed for purposes of clarity.
Figure 2:
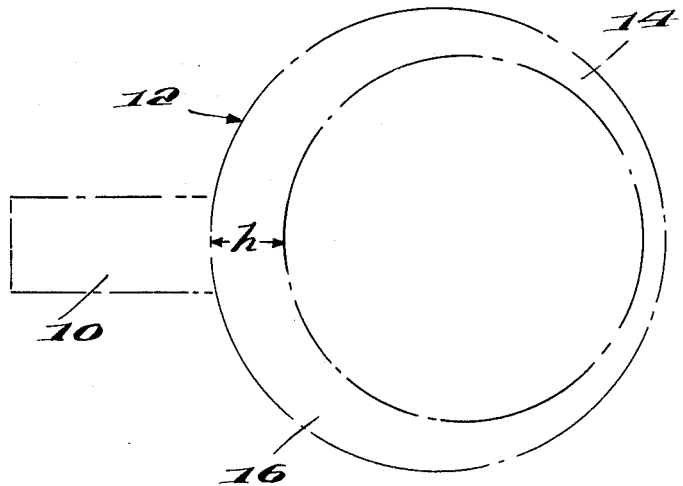
FIG. 2 is a plan view of the ring shown in FIG. 1.

As shown in FIGS. 1 and 2, an inlet conduit 10 communicates with each hollow ring 12 in the zone of maximum height ($h$) or cross-sectional area. Since the ring is symmetrical, fluid flow is divided equally between equidimensional channel branches 14, 16, the inner and outer walls of which are formed by the surfaces of eccentric cylinders. The inner wall has a number of uniformly spaced and sized discharge holes 18. Alternatively, several rows of holes or a narrow circumferential slot may be provided.

Figure 3:
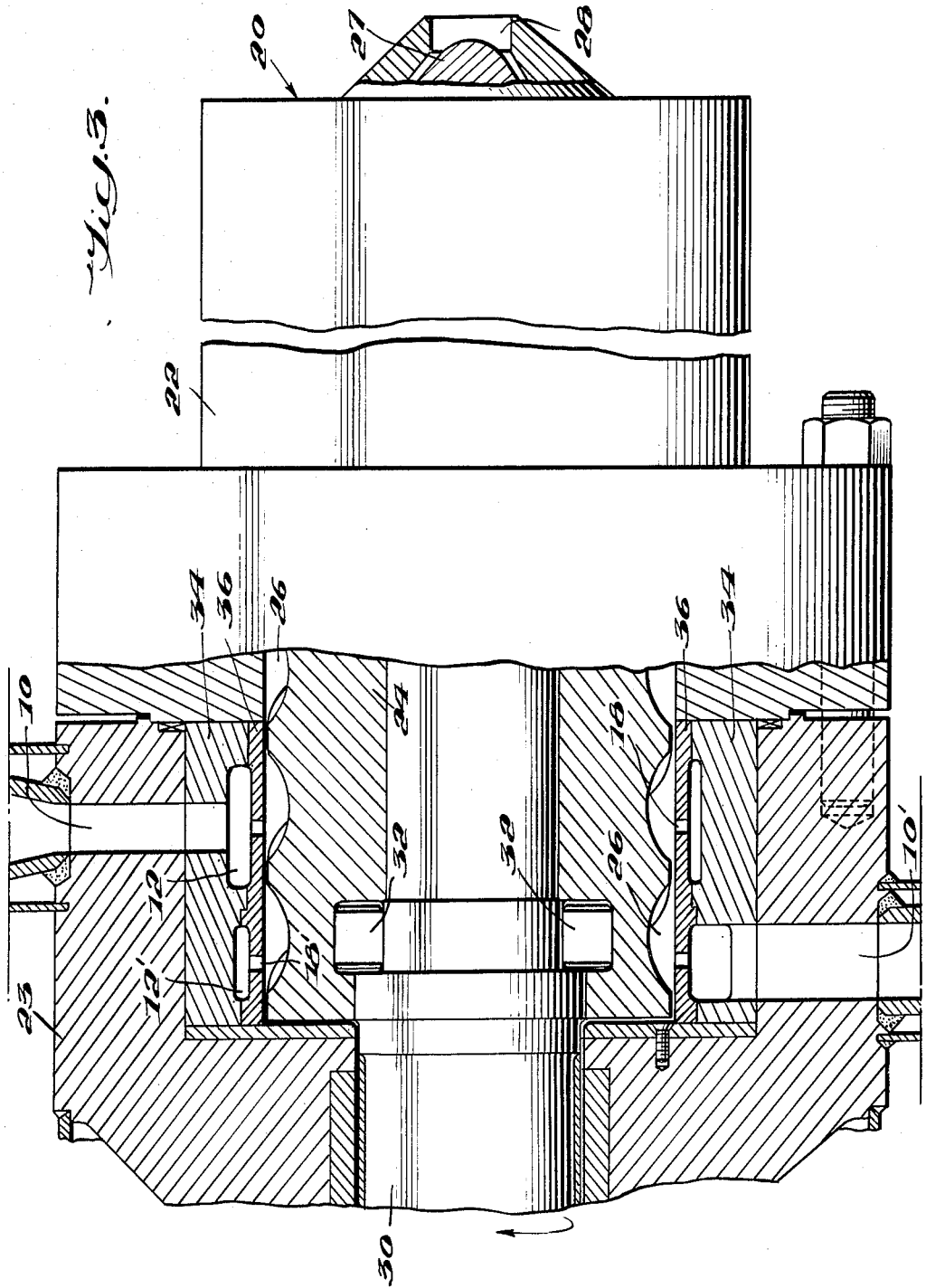
FIG. 3 is a side view of a Saxton type screw mixer into which two distribution rings have been incorporated, various parts having been broken away and shown in section to reveal details of construction and arrangement.

The manner in which two distribution rings 12, 12' have been incorporated into a Saxton type screw mixer 20 has been illustrated in FIG. 3. Mixer 20 includes, generally, as components thereof, a barrel or housing 22 within which a hollow screw 24 is mounted for rotation. Barrel 22 may be heated by conventional means (not shown) such as electrical heaters or a heated fluid. Screw 24 has grooves 26 corresponding to the minor grooves of Saxton and major grooves (not shown). At one end, screw 24 has a bullet nose 27 over which mixed viscous materials flow to an outlet 28 in housing 22. At its opposite end, within a flanged fitting 23 on housing 22, screw 24 is coupled with a drive shaft 30 by a plurality of cylindrical keys 32 and is surrounded by a pair of cylindrical inserts 34, 36.

The inner surface of insert 34 is provided with two wide grooves which vary in height from maximums adjacent inlets 10, 10' to minimums at diametrically opposed locations and which cooperate with constant height grooves in the outer surface of insert 36 to form eccentric channels, each of which corresponds to the channel shown schematically at 14, 16 in FIGS. 1, 2.

EXAMPLE

Two distribution rings are provided at the inlet of a screw pump-mixer as shown in FIG. 3 for feeding molten streams of polymers A and B uniformly to the mixing zone. Polymer A enters through jacketed inlet conduit 10 and polymer B through jacketed inlet conduit 10'. Pertinent dimensions, relationships and operating conditions are presented below in tabular form.

*Table*

| Viscous material | A | B |
| --- | --- | --- |
| Flow rate, ft.³/hr | 1.66 | 0.42 |
| Viscosity in channels, poises | 2,400 | 4,500 |
| Viscosity in holes, poises | 2,400 | 4,500 |
| Outside diameter of channel, in | 6.600 | 6.096 |
| Inside diameter of channel, in | 5.344 | 5.344 |
| Maximum channel height ($h$), in | 0.917 | 0.626 |
| Minimum channel height, in | 0.289 | 0.25 |
| Axial width of channel, in | 0.875 | 0.75 |
| Length of holes, in | 0.126 | 0.176 |
| Diameter of holes, in | 0.0465 | 0.0465 |
| Number of holes | 120 | 60 |
| Pressure drop through each hole, p.s.i | 380 | 570 |

Examination of the mixture exiting at 28 (FIG. 3) shows good uniformity of mixing. When the test is repeated, except that A and B are fed directly (without eccentric distribution rings) to the screw through radial inlets 10, 10', it is noted that the output mixture contains small blobs of component B distributed in component A.

The eccentric ring distributor of this invention is especially useful for supplying liquids of high viscosity to cylindrical mixing devices such as screw extruders. The typical liquids are those which will flow under streamline conditions, for example, high viscosity corn syrup, molten polymer and the like. Typical mixing processes are those in which a colored or modified master batch of polymer is mixed with a base material, different polymers are melt blended, reclaimed polymer is blended with new, and the like. Particular polymers which may be mentioned include polyvinyl chloride, polyvinyl acetate, polymethyl methacrylate, polyvinylidene chloride, polystyrene, polyamides and polyesters.

the device is especially useful for those liquids which tend to deposit gel or decomposition products on the inside of conduits unless subjected to a shear which is greater than a specified minimum amount.

Having thus described the invention, what is claimed as new and desired to be secured by Letters Patent is:

1. A device for mixing viscous materials, said device comprising: an elongated driven screw; a barrel surrounding said screw and provided with a materials outlet adjacent one end of the screw; and a pair of inlet means through which different viscous materials are delivered to said screw adjacent its other end, one of said inlet means comprising an inlet conduit extending through said barrel and a hollow distribution ring surrounding said screw, said ring defining an eccentric channel, being in communication at its zone of maximum cross-sectional area with said inlet conduit and being provided with at least one row of discharge holes on the inner periphery thereof, said holes being uniformly spaced an equidimensional.

2. The device of claim 1 wherein said distribution ring is comprised of a pair of telescoped cylindrical inserts and said channel is defined by grooves in the abutting surfaces of the inserts, the groove in the outer of said inserts varying in height whereby said channel is eccentric.

3. A device for mixing viscous materials, said device comprising: an elongated drive screw; a barrel surrounding said screw and provided with a materials outlet adjacent one end of the screw; and a pair of inlet means through which viscous materials are delivered to said screw adjacent its other end, one of said inlet means comprising a conduit extending through said barrel and ring structure defining an eccentric distribution channel surrounding said screw, said channel communicating at its zone of maximum cross-sectional area with said conduit and being provided with outlet means discharging radially and inwardly toward said screw through its circumference.

4. A device for mixing viscous materials, said device comprising: an elongated driven screw; a barrel surrounding the screw and provided with a materials outlet adjacent one end of the screw; ring structure defining a pair of distribution channels surrounding said screw; at least one inlet conduit extending through said barrel to each channel, said channels having cross-sectional areas varying from maxima adjacent said inlet conduits to minima at points circumferentially remote therefrom, each channel being provided with outlet means discharging radially and inwardly toward said screw through its circumference.

References Cited by the Examiner

UNITED STATES PATENTS 2,419,410  4/1947  Maurer _____ 259—168 X
3,006,615  10/1961  Mason _____ 259—9 X WALTER A. SCHEEL, *Primary Examiner.*